US012700340B2

(12) United States Patent
Suzuki

(10) Patent No.: US 12,700,340 B2
(45) Date of Patent: Aug. 4, 2026

(54) DISPLAY DEVICE

(71) Applicant: LG Display Co., Ltd., Seoul (KR)

(72) Inventor: Takayuki Suzuki, Kanagawa (JP)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/532,260

(22) Filed: Dec. 7, 2023

(65) Prior Publication Data

US 2024/0212575 A1 Jun. 27, 2024

(30) Foreign Application Priority Data

Dec. 26, 2022 (JP) ................................ 2022-207970

(51) Int. Cl.
*G09G 3/20* (2006.01)
*H01Q 1/22* (2006.01)
*H01Q 21/00* (2006.01)

(52) U.S. Cl.
CPC ......... *G09G 3/2096* (2013.01); *H01Q 1/2266* (2013.01); *H01Q 21/0012* (2013.01); *G09G 2340/0492* (2013.01); *G09G 2370/16* (2013.01)

(58) Field of Classification Search
None
See application file for complete search history.

(56) References Cited

U.S. PATENT DOCUMENTS 4,939,400 A * 7/1990 Matsushita .............. H02K 3/00 310/DIG. 6
9,774,814 B1 * 9/2017 Aljhdali .................... H04N 5/60
2007/0268143 A1 * 11/2007 Copeland ............... H01Q 9/065 340/572.7
2010/0163630 A1 * 7/2010 Ochi ................ G06K 19/07749 235/492

(Continued)

FOREIGN PATENT DOCUMENTS

CN 111342229 A * 6/2020 ............... H01Q 1/22
JP 2012-238936 A 12/2012
JP 5789774 B2 10/2015

(Continued)

OTHER PUBLICATIONS

Office Action in Korean Appln. No. 10-2023-0094305, mailed on Oct. 1, 2025, 11 pages (with English translation).

*Primary Examiner* — Christopher R Lamb
(74) *Attorney, Agent, or Firm* — Fish & Richardson P.C.

(57) ABSTRACT

A display device includes an input portion receiving a signal input, and including a transmission board transmitting the signal input; and a display portion rotatably connected to the input portion, and including a reception board receiving the signal from the transmission board, and a display panel displaying the signal received by the reception board, wherein one of the reception and transmission boards includes: a plurality of antenna pattern groups each including a plurality of first antenna patterns that transmit or receive respective signals, and arranged at rotationally sym- (Continued)

metric positions; and a signal line connecting in series the corresponding first antenna patterns of the plurality of antenna pattern groups, and wherein the other of the reception and transmission boards includes a plurality of second antenna patterns that are arranged at a position facing one antenna pattern group among the plurality of antenna pattern groups, and that receive or transmit respective signals.

15 Claims, 10 Drawing Sheets

(56) References Cited

U.S. PATENT DOCUMENTS

| | | | | |
|---|---|---|---|---|
| 2012/0122400 | A1* | 5/2012 | Kitagawa | H04N 23/695<br>455/41.2 |
| 2020/0202762 | A1* | 6/2020 | Hiraki | G09G 3/20 |

FOREIGN PATENT DOCUMENTS

| | | | |
|---|---|---|---|
| JP | 2020-102063 | A | 7/2020 |
| JP | 2022-061050 | A | 4/2022 |
| KR | 20220045883 | A | 4/2022 |
| WO | 2011/151975 | A1 | 12/2011 |

* cited by examiner

DISPLAY DEVICE

CROSS-REFERENCE TO RELATED APPLICATION

The present application claims the priority of Japanese Patent Application No. 2022-207970 filed on Dec. 26, 2022, which is hereby incorporated by reference in its entirety.

BACKGROUND

Field of the Disclosure

The present disclosure relates to a display device.

Description of the Background

Generally, for example, display devices such as organic light emitting diode (OLED) display device and liquid crystal display device are equipped with a video terminal such as HDMI® terminal or DisplayPort terminal. A signal cable for transmitting an image signal is connected to the video terminal, and the display device displays the image signal input from the video terminal.

Recently, there is a display device that may switch between a horizontal image and a vertical image by rotating a display screen. In such the display device, by wirelessly transmitting the image signal input from the video terminal, an image signal transmission for a rotating display screen is realized. For example, the image signal input from the video terminal is wirelessly transmitted from a plurality of antenna electrodes of a transmission board connected to the video terminal, and is received by a plurality of antenna electrodes of a reception board rotatably supported by the transmission board. The image signal received by the antenna electrodes of the reception board is displayed on the display screen.

Since the image signal is transmitted between the antenna electrodes of the transmission board and the reception board facing each other, even if the reception board rotates with respect to the transmission board, the antenna electrodes of both boards are arranged at opposite positions, so that the image signal input from the video terminal may be transmitted and displayed on the rotatable display screen as disclosed in Japanese Patent Application Publication No. 2022-61050 and Japanese Patent Application Publication No. 2020-102063.

The description provided in the background section should not be assumed to be prior art merely because it is mentioned in or associated with the background section. The background section may include information that describes one or more aspects of the subject technology.

SUMMARY

However, when displaying an image on a rotatable display screen, there is a problem that size and cost of circuit of a display device increase. Specifically, in a path for transmitting an image signal, combination of antenna electrodes facing each other varies depending on a rotation angle of a reception board with respect to a transmission board, so that depending on the rotation angle, for example, it becomes necessary to change image signal array of four lanes and transmit the image signal between the transmission and reception antenna electrodes facing each other.

Accordingly, circuits such as a circuit that detects the rotation angle of the reception board with respect to the transmission board or a circuit that change the image signal array are added, thereby increasing a circuit scale. In addition, a selector circuit for changing a signal array of a high speed, for example, several Gbps, such as the image signal, is usually configured by connecting a plurality of integrated circuits (ICs) in multiple stages, so that the circuit scale increases significantly and the cost also increases.

Accordingly, the present disclosure is directed to a display device that substantially obviates one or more of the problems due to limitations and disadvantages of the related art.

More specifically, the present disclosure is to provide a display device which may display an image on a rotatable display screen while suppressing an increase in circuit size and cost.

Additional features and advantages of the disclosure will be set forth in the description which follows, and in part will be apparent from the description, or may be learned by practice of the disclosure. These and other advantages of the disclosure will be realized and attained by the structure particularly pointed out in the written description and claims hereof as well as the appended drawings.

To achieve these and other advantages and in accordance with the present disclosure, as embodied and broadly described herein, a display device includes: an input portion which receives a signal input thereto, and includes a transmission board transmitting the signal input; and a display portion which is rotatably connected to the input portion, and includes a reception board receiving the signal transmitted from the transmission board, and a display panel displaying the signal received by the reception board, wherein one of the transmission board and the reception board includes: a plurality of antenna pattern groups which each includes a plurality of first antenna patterns that transmit or receive respective signals, and are arranged at rotationally symmetric positions; and a signal line connecting in series the first antenna patterns, corresponding to each other, of the plurality of antenna pattern groups, and wherein the other of the transmission board and the reception board includes a plurality of second antenna patterns that are arranged at a position facing one antenna pattern group among the plurality of antenna pattern groups, and that receive or transmit respective signals.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principles of the disclosure.

In the drawings.

DETAILED DESCRIPTION

Figure 1:
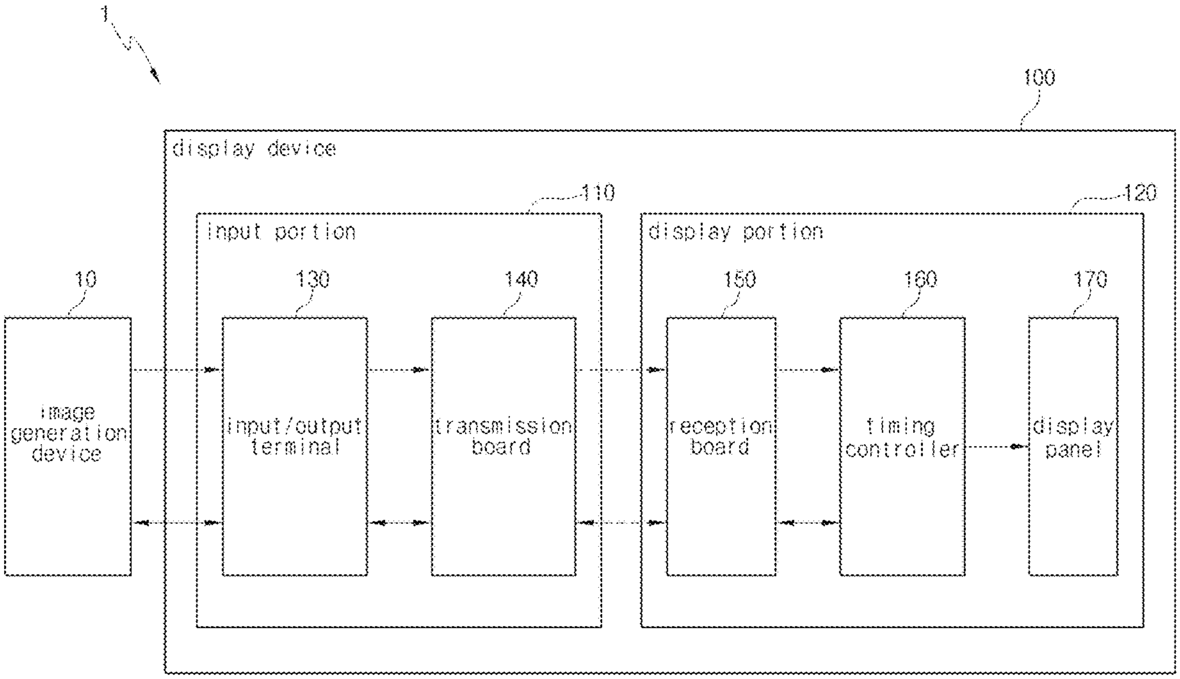
FIG. 1 is a block diagram illustrating a configuration of a display system according to a first aspect of the present disclosure.

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations may be selected only for convenience of writing the specification and may be thus different from those used in actual products.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments may be provided so that this disclosure may be sufficiently thorough and complete to assist those skilled in the art to fully understand the scope of the present disclosure. Further, the present disclosure is only defined by scopes of claims.

The shapes, sizes, ratios, angles, numbers, and the like, which are illustrated in the drawings to describe various example embodiments of the present disclosure are merely given by way of example. Therefore, the present disclosure is not limited to the illustrations in the drawings. The same or similar elements are designated by the same reference numerals throughout the specification unless otherwise specified. In the following description where the detailed description of the relevant known function or configuration may unnecessarily obscure an important point of the present disclosure, a detailed description of such known function of configuration may be omitted.

Where the terms "comprise," "have," "include" and the like are used, one or more other elements may be added unless the terms, such as "only," is used. An element described in the singular form is intended to include plurality of elements, and vice versa, unless the context clearly indicates otherwise. Any implementation described herein as an "example" is not necessarily to be construed as preferred or advantageous over other implementations.

In construing an element, the element is construed as including an error range or tolerance range although there is no explicit description of such an error or tolerance range.

Where positional relationships are described, for example, where the positional relationship between two parts is described using "on," "over," "under," "above," "below," "beneath," "near," "close to," or "adjacent to," "beside," "next to," or the like, one or more other parts may be disposed between the two parts unless a more limiting term, such as "immediate(ly)," "direct(ly)," or "close(ly)" is used. For example, when a structure is described as being positioned "on," "over," "under," "above," "below," "beneath," "near," "close to," or "adjacent to," "beside," or "next to" another structure, this description should be construed as including a case in which the structures contact each other as well as a case in which a third structure is disposed or interposed therebetween. Furthermore, the terms "left," "right," "top," "bottom, "downward," "upward," "upper," "lower," and the like refer to an arbitrary frame of reference.

In describing elements of the present disclosure, the terms like "first," "second," "A," "B," "(a)," and "(b)" may be used. These terms may be merely for differentiating one element from another element, and the essence, sequence, order, or number of the corresponding elements should not be limited by these terms. Also, when an element or layer is described as being "connected," "coupled," or "adhered" to another element or layer, the element or layer can not only be directly connected, or adhered to that other element or layer, but also be indirectly connected, or adhered to that other another element or layer with one or more intervening elements or layers "disposed" between the elements or layers, unless otherwise specified.

The term "at least one" should be understood as including any and all combinations of one or more of the associated listed items. For example, the meaning of "at least one of a first element, a second element, and a third element" encompasses the combination of all three listed elements, combinations of any two of the three elements, as well as each individual element, the first element, the second element, or the third element.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein. For example, the term "part" or "unit" may apply, for example, to a separate circuit or structure, an integrated circuit, a computational block of a circuit device, or any structure configured to perform a described function as should be understood to one of ordinary skill in the art.

Hereinafter, aspects of the present disclosure are described in detail with reference to the drawings. The aspects described below are examples and are not limited by this description. Further, all the components of each display device according to all embodiments of the present disclosure are operatively coupled and configured.

FIG. 1 is a block diagram illustrating a configuration of a display system according to first aspect. The display system 1 shown in FIG. 1 includes an image generation device 10 and a display device 100.

The image generation device 10 is, for example, a set-top box or a computer, and generates and outputs an image signal according to an image source. The image generation device 10 transmits the generated image signal to the display device 100 through a plurality of lanes. For example, the image generation device 10 transmits an image signal to the display device 100 having a full high definition (FHD) resolution, for example, using a V-by-One (registered trademark) HS method.

In addition, the image generation device 10 transmits and receives control signals to and from the display device 100. The control signals transmitted and received between the image generation device 10 and the display device 100 include, for example, a Hot Plug Detect signal of a V-by-One signal, a Lock Detect signal, and an I2C (Inter-Integrated Circuit: inter-panel communication) signal, abnormality detection signals, a signal related to image quality correction, and the like.

The display device 100 is, for example, an OLED display device, liquid crystal display device, plasma display device, or LED (light emitting diode) display device, or the like. The display device 100 receives the image signal from the image generation device 10, and displays an image based on the image signal on a display screen. The display device 100 has a rotatable display screen, and may switch between, for example, a vertically long display screen and a horizontally long display screen according to a rotation of the display screen.

Specifically, the display device 100 has an input portion 110 that receives a signal input from the image generation device 10, and a display portion 120 that is rotatably connected to the input portion 110 and displays an image. The input portion 110 has an input/output terminal 130 and a transmission board 140. Meanwhile, the display portion 120 includes a reception board 150, a timing controller 160, and a display panel 170.

The input/output terminal 130 is a terminal to which a cable connecting the image generation device 10 and the display device 100 may be connected. The input/output terminal 130 receives the image signal and the control signal from the image generation device 10 and outputs the control signal to the image generation device 10.

The transmission board 140 is provided with an antenna pattern that transmits an image signal, and wirelessly transmits the image signal input to the input/output terminal 130 to the display portion 120. In addition, the transmission board 140 has an antenna pattern for transmitting and receiving the control signal, wirelessly transmits the control signal input to the input/output terminal 130 to the display portion 120, and wirelessly receives the control signal transmitted from the display portion 120. In order words, the transmission board 140 may not only have a function of transmitting signals, but also have a function of receiving signals.

The reception board 150 is rotatably supported with respect to the transmission board 140, and allows the display portion 120 to rotate with respect to the input portion 110. The reception board 150 has an antenna pattern for receiving the image signal, wirelessly receives the image signal transmitted from the transmission board 140, and outputs the image signal to the timing controller 160. In addition, the reception board 150 has an antenna pattern for transmitting and receiving the control signal, wirelessly receives the control signal transmitted from the transmission board 140, and wirelessly transmits the control signal output from the timing controller 160 to the transmission board 140. In order words, the reception board 150 may not only have a function of receiving signals, but also have a function of transmitting signals.

The timing controller 160 controls image display on the display panel 170 based on the control signal input from the reception board 150. For example, the timing controller 160 generates a luminance data representing a pixel luminance based on the image signal input from the reception board 150 and outputs the luminance data to the display panel 170 to display the image on the display panel 170. In addition, the image signal may include timing signals, such as a vertical synchronization signal, a horizontal synchronization signal, and a data enable signal.

The display panel 170 includes a plurality of pixels arranged in a matrix, sets a luminance of each pixel according to the luminance data, and displays an image. In addition, each pixel may include a plurality of subpixels of respective colors, such as red (R), green (G), and blue (B). The display panel 170 has, for example, a rectangular shape, but the present disclosure is not limited thereto, and as the display portion 120 rotates, the display panel 170 displays an image on a horizontally long display screen with a long side being horizontal, or displays an image on a vertically long display screen with the long side being vertical.

Next, a connection structure of the transmission board 140 and the reception board 150 that connect the input portion 110 and the display portion 120 is described with reference to FIG. 2.

Figure 2:
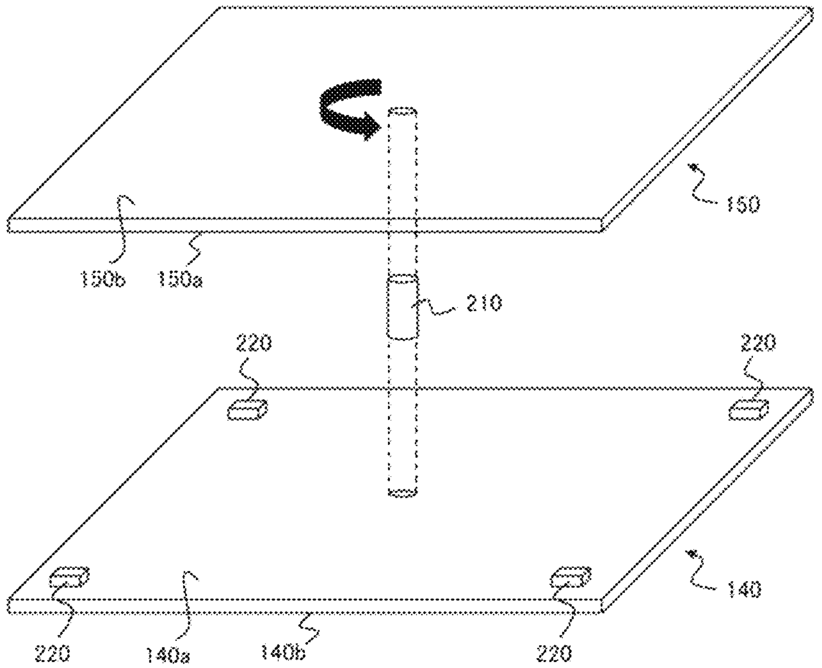
FIG. 2 is a schematic view illustrating an example of a connection structure of a transmission board and a reception board of the present disclosure.

As shown in FIG. 2, both the transmission board 140 and the reception board 150 have, for example, a square shape and are arranged to face each other. However, the present disclosure is not limited thereto, and each of the transmission board 140 and the reception board 150 may have other various shapes such as circular shape, rectangle shape, polygon shape, and oval shape etc. For example, a surface 140*a* of the transmission board 140 and a surface 150*a* of the reception board 150 face each other, and a center of each board is rotatably connected by a shaft member 210. Accordingly, in a state where the reception board 150 is rotatable with respect to the transmission board 140 using the shaft member 210 as a rotation axis, and the input portion 110 including the transmission board 140 is fixed, the display portion 120 including the reception board 150 may be rotated. As a result, by rotating the display panel 170, for example, it becomes possible to switch between a horizontally long display screen and a vertically long display screen.

Protruding poles 220 are formed at four corners of the surface 140*a* of the transmission board 140. In addition, fitting holes (not shown) are formed at four corners of the surface 150*a* of the reception board 150. In a state where the four corners of the transmission board 140 and the four corners of the reception board 150 face each other, and the transmission board 140 and the reception board 150 overlap when viewed in plan, the protruding poles 220 of the transmission board 140 may be fitted into the fitting holes of the reception board 150 to fix the position of the reception board 150 with respect to the transmission board 140. For example, the reception board 150 may be fixed at a position where the reception board 150 rotates every 90 degrees with respect to the transmission board 140, and the position of the rotating display portion 120 may be adjusted.

In addition, a mechanism for adjusting the positions of the transmission board 140 and the reception board 150 does not need to be based on the protruding pole 220 and the fitting hole. For example, a magnet is placed at each of the four corners of a surface 140*b* of the transmission board 140 and each of the four corners of a surface 150*b* of the reception board 150, and by magnetic force, the reception board 150 may be fixed at a position where the reception board 150 rotates every 90 degrees with respect to the transmission board 140.

Figure 3A:
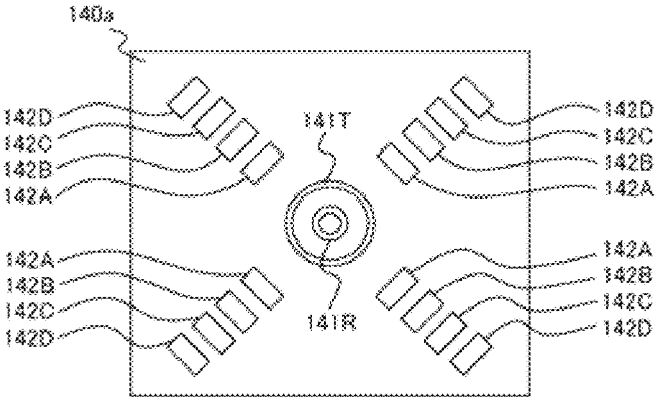
FIGS. 3A and 3B are views illustrating examples of a transmission board according to a first aspect of the present disclosure.
Figure 3B:
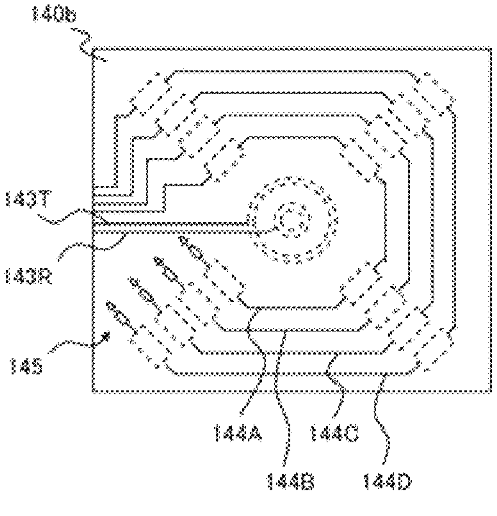

FIGS. 3A and 3B are views illustrating examples of a transmission board according to a first aspect of the present disclosure. FIG. 3A is a plan view of a surface 140*a* facing a reception board 150, and FIG. 3B is a plan view of a rear surface 140*b* opposite to the surface 140*a* (also referred to as front surface 140*a*).

As shown in FIG. 3A, on the surface 140*a*, antenna patterns 141T and 141R and antenna patterns 142A, 142B, 142C and 142D are formed.

The antenna patterns 141T and 141R are metal patterns formed in concentric circles with a center of the surface 140*a* as a central point. The antenna patterns 141T and 141R wirelessly transmit and receive control signals to and from the reception board 150. Specifically, the antenna pattern 141T wirelessly transmits a control signal to the reception board 150, and the antenna pattern 141R wirelessly receives a control signal from the reception board 150. The antenna pattern 141R has a smaller diameter than the antenna pattern 141T, and the above-described shaft member 210 is connected inside the antenna pattern 141R.

The antenna patterns 142A, 142B, 142C, and 142D are metal patterns arranged radially with respect to the center of the surface 140*a*. For example, the antenna patterns 142A, 142B, 142C, and 142D are arranged, in this order, in a line outward from the center of the surface 140*a*. The antenna patterns 142A, 142B, 142C, and 142D wirelessly transmit image signals to the reception board 150. For example, each of the four antenna patterns 142A, 142B, 142C, and 142D wirelessly transmit the image signal of the corresponding lane among the image signals of four lanes.

A plurality of antenna pattern groups each including the antenna patterns 142A, 142B, 142C, and 142D arranged in a line are arranged to surround the antenna patterns 141T and 141R, and each antenna pattern group extends radially around the antenna patterns 141T and 141R. In FIG. 3, four antenna pattern groups are arranged, and the radial directions in which respective antenna pattern group extend are different by 90 degrees. For example, each antenna pattern group is configured with the antenna patterns 142A, 142B, 142C, and 142D arranged in a line from the center of the surface 140*a* toward each of the four vertices of the surface 140*a*.

The antenna patterns 142A, 142B, 142C, and 142D each have, for example, a square shape with a side of about 5 mm, and are arranged closely, so that even when the plurality of antenna pattern groups are arranged on the transmission board 140, an increase in mounting area is limited. For example, an increase in size of the transmission board 140 due to arranging the plurality of antenna pattern groups may be ignored.

The corresponding antenna patterns 142A, 142B, 142C, and 142D of the antenna pattern groups are equidistant from the center of the surface 140*a*. For example, all four antenna patterns 142A are arranged at the same distance from the center of the surface 140*a*, and for example, all four antenna patterns 142B are arranged at the same distance from the center of the surface 140*a*. As described later, four antenna patterns equidistant from the center are connected in series by a corresponding signal line and wirelessly transmit an image signal of the same lane.

As such, the antenna patterns 141T and 141R are arranged concentrically with the center of the surface 140*a* as the center point, and the antenna patterns 142A, 142B, 142C, and 142D are arranged in rotationally symmetric positions, so that when the transmission board 140 is rotated every 90 degrees around the shaft member 210, the antenna pattern arrangement does not change in appearance.

As shown in FIG. 3B, signal lines 143T and 143R, signal lines 144A, 144B, 144C, and 144D, and termination resistors 145 are formed on the surface 140*b*.

One ends of the signal lines 143T and 143R are connected to the corresponding input/output terminals 130 and the other ends of the signal lines 143T and 143R are connected to the antenna patterns 141T and 141R. For example, the signal line 143T connects the input/output terminal 130 with the antenna pattern 141T, and the signal line 143R connects the input/output terminal 130 with the antenna pattern 141R. The ends of the signal lines 143T and 143R connected to the antenna patterns 141T and 141R penetrate the transmission board 140 from the surface 140*b* to the surface 140*a*, and are thus connected to the antenna patterns 141T and 141R formed on the surface 140*a*.

In addition, the signal lines 143T and 143R transmit the control signals between the input/output terminals 130 and the antenna patterns 141T and 141R. Specifically, the signal line 143T transmits the control signal input to the input/output terminal 130 to the antenna pattern 141T. The signal line 143R transmits the control signal received by the antenna pattern 141R to the input/output terminal 130.

One ends of the signal lines 144A, 144B, 144C, and 144D are connected to the corresponding input/output terminals 130, the signal lines 144A, 144B, 144C, and 144D connects in series the corresponding antenna patterns 142A, 142B, 142C, and 142D of the antenna pattern groups, and the other ends of the signal lines 144A, 144B, 144C, and 144D are connected to the corresponding termination resistors 145. For example, the signal line 144A connects the input/output terminal 130, the four antenna patterns 142A, and the termination resistor 145, and the signal line 144B connects the input/output terminal 130, the four antenna patterns 142B, and the termination resistor 145, the signal line 144C connects the input/output terminal 130, the four antenna patterns 142C, and the termination resistor 145, and the signal line 144D connects the input/output terminal 130, the four antenna patterns 142D, and the termination resistor 145. Connection portions of the signal lines 144A, 144B, 144C, and 144D connected to the antenna patterns 142A, 142B, 142C, and 142D penetrate the transmission board 140 from the surface 140*b* to the surface 140*a*, and are thus connected to the antenna patterns 142A, 142B, 142C, and 142D formed on the surface 140*a*.

The signal lines 144A, 144B, 144C, and 144D transmit the image signals input to the input/output terminals 130 to the respective antenna patterns 142A, 142B, 142C, and 142D. Specifically, the signal line 144A transmits the image signal input to the input/output terminal 130 to the four antenna patterns 142A, the signal line 144B transmits the image signal input to the input/output terminal 130 to the four antenna patterns 142B, the signal line 144C transmits the image signal input to the input/output terminal 130 to the four antenna patterns 142C, and the signal line 144D transmits the image signal input to the input/output terminal 130 to the four antenna patterns 142D.

The termination resistors 145 are connected to the ends of the signal lines 144A, 144B, 144C, and 144D, and reduce signal reflection of the image signals transmitted through the signal lines 144A, 144B, 144C, and 144D.

As such, the four antenna patterns equidistant from the center of the transmission board 140 may wirelessly transmit the same image signal because they are connected in series by the signal line. Accordingly, the four antenna pattern groups each including the antenna patterns 142A, 142B, 142C, and 142D may wirelessly transmit the four same image signals of the four lanes. In addition, in this aspect, it is assumed that corresponding to the image signals of the four lanes, each antenna pattern group has four antenna patterns 142A, 142B, 142C, and 142D. However, in accordance with increase or decrease in a number of lanes of image signal, a number of the antenna patterns of each antenna pattern group may increase or decrease.

Figure 4A:
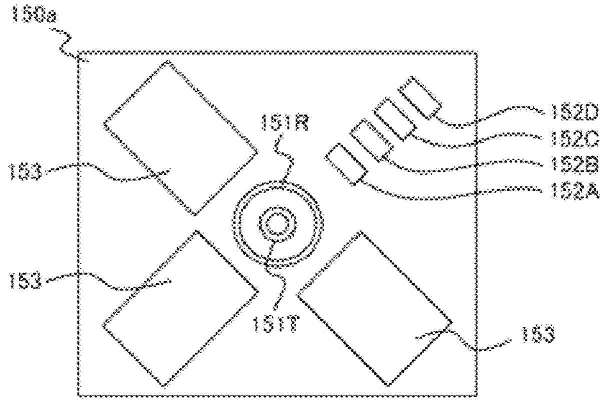
FIGS. 4A and 4B are views illustrating examples of a reception board according to the first aspect of the present disclosure.
Figure 4B:
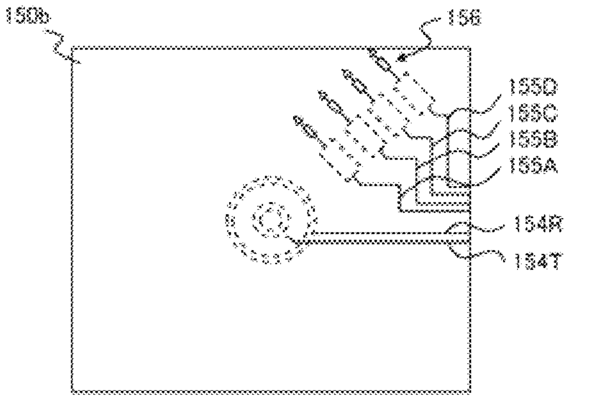

FIGS. 4A and 4B are views illustrating examples of a reception board according to a first aspect. FIG. 4A is a plan view of a surface 150*a* facing the transmission board 140, and FIG. 4B is a plan view of a rear surface 150*b* opposite to the surface 150*a* (also referred to as the front surface 150*a*).

As shown in FIG. 4A, antenna patterns 151R and 151T, antenna patterns 152A, 152B, 152C and 152D, and insulating regions 153 are formed on the surface 150*a*.

The antenna patterns 151R and 151T are metal patterns formed in concentric circles with a center of the surface 150*a* as a central point. The antenna patterns 151R and 151T wirelessly transmit and receive control signals to and from the transmission board 140. Specifically, the antenna pattern 151R wirelessly receives the control signal from the transmission board 140, and the antenna pattern 151T wirelessly transmits the control signal to the transmission board 140. The antenna pattern 151T has a smaller diameter than the antenna pattern 151R, and the above-described shaft member 210 is connected inside the antenna pattern 151T.

The antenna patterns 151R and 151T face the antenna patterns 141T and 141R formed on the surface 140*a* of the transmission board 140. For example, the antenna pattern 151R faces the antenna pattern 141T, and the antenna pattern 151T faces the antenna pattern 141R. As the concentric antenna patterns 151R and 151T face the concentric antenna patterns 141T and 141R, the control signals may be transmitted and received even when the reception board 150 rotates with respect to the transmission board 140.

The antenna patterns 152A, 152B, 152C, and 152D are metal patterns arranged radially with respect to the center of the surface 150*a*. For example, the antenna patterns 152A, 152B, 152C, and 152D are arranged, in this order, in a line outward from the center of the surface 150*a*. The antenna patterns 152A, 152B, 152C, and 152D wirelessly receive the image signals from the transmission board 140. For example, each of the four antenna patterns 152A, 152B, 152C, and 152D wirelessly receive the image signal of the corresponding lane among the image signals of the four lanes.

The antenna patterns 152A, 152B, 152C, and 152D arranged in a line are disposed at positions facing the antenna patterns 142A, 142B, 142C, and 142D formed on the surface 140*a* of the transmission board 140. For example, the antenna patterns 152A, 152B, 152C, and 152D are disposed at positions corresponding to the antenna patterns 142A, 142B, 142C, and 142D of one antenna pattern group on the transmission board 140. In this way, the antenna patterns 152A, 152B, 152C, and 152D face one antenna pattern group of the transmission board 140, so that the antenna patterns 152A, 152B, 152C, and 152D may receive the image signals transmitted from one antenna pattern group facing them among the four antenna pattern groups of the transmission board 140. In other words, it becomes possible to transmit and receive the image signals between the opposing antenna patterns each time the reception board 150 rotates by 90 degrees with respect to the transmission board 140.

The insulating region 153 is a region where a substrate (or base member) of the reception board 150, which is an insulator, is exposed at least in part. The substrate of the reception board 150 may be exposed throughout the insulating region 153, and a metal ground pattern may be disposed in a mesh shape on a portion of the insulating region 153. Alternatively, the insulating region 153 may be a through hole formed by digging out the substrate of the reception board 150.

The insulating region 153 is disposed at a position facing the antenna patterns 142A, 142B, 142C, and 142D formed on the surface 140*a* of the transmission board 140. For example, three insulating regions 153 are formed at positions corresponding to the antenna patterns 142A, 142B, 142C, and 142D of the three antenna pattern groups on the transmission board 140. By forming the insulating regions 153, the image signals transmitted from the antenna pattern groups that do not face the antenna patterns 152A, 152B, 152C, and 152D are not received by the reception board 150.

As shown in FIG. 4B, on the surface 150*b*, signal lines 154R and 154T, signal lines 155A, 155B, 155C and 155D, and termination resistors 156 are formed.

One ends of the signal lines 154R and 154T are connected to another component within the display portion 120 such as the timing controller 160, and the other ends of the signal lines 154R and 154T are connected to the antenna patterns 151R and 151T. For example, the signal line 154R connects the timing controller 160 with the antenna pattern 151R, and the signal line 154T connects the timing controller 160 and the antenna pattern 151T. The ends of the signal lines 154R and 154T connected to the antenna patterns 151R and 151T penetrate the reception board 150 from the surface 150*b* to the surface 150*a*, and are thus connected to the antenna patterns 151R and 151T formed on the surface 150*a*.

The signal lines 154R and 154T transmit the control signals between the timing controller 160 and the antenna patterns 151R and 151T. Specifically, the signal line 154R transmits the control signal received by the antenna pattern 151R to the timing controller 160. The signal line 154T transmits the control signal output from the timing controller 160 to the antenna pattern 151T.

One ends of the signal lines 155A, 155B, 155C, and 155D are connected to the timing controller 160, the signal lines 155A, 155B, 155C, and 155D passes through the antenna patterns 152A, 152B, 152C, and 152D, respectively, and the other ends of the signal lines 155A, 155B, 155C, and 155D are connected to the termination resistors 156. For example, the signal line 155A connects the timing controller 160, the antenna pattern 152A, and the termination resistor 156, the signal line 155B connects the timing controller 160, the antenna pattern 152B, and the termination resistor 156, the signal line 155C connects the timing controller 160, the antenna pattern 152C, and the termination resistor 156, and the signal line 155D connects the timing controller 160, the antenna pattern 152D, and the termination resistor 156. The connection portions of the signal lines 155A, 155B, 155C, and 155D connected to the antenna patterns 152A, 152B, 152C, and 152D penetrate the reception board 150 from the surface 150*b* to the surface 150*a*, and are thus connected to the antenna patterns 152A, 152B, 152C, and 152D formed on the surface 150*a*.

In addition, the signal lines 155A, 155B, 155C, and 155D transmit the image signals received by the antenna patterns 152A, 152B, 152C, and 152D to the timing controller 160. Specifically, the signal line 155A transmits the image signal received by the antenna pattern 152A to the timing controller 160, the signal line 155B transmits the image signal received by the antenna pattern 152B to the timing controller 160, the signal line 155C transmits the image signal received by the antenna pattern 152C to the timing controller 160, and the signal line 155D transmits the image signal received by the antenna pattern 152D to the timing controller 160.

The termination resistors 156 are connected to the ends of the signal lines 155A, 155B, 155C, and 155D, and reduce signal reflection of the image signals transmitted through the signal lines 155A, 155B, 155C, and 155D.

As such, on the surface 150*a* of the reception board 150, the antenna patterns 152A, 152B, 152C, and 152D are located at the position corresponding to one antenna pattern group among the four antenna pattern groups of the transmission board 140, and the insulating regions 153 are formed at the positions corresponding to the remaining three antenna pattern groups. Therefore, even when the reception board 150 rotates by 90 degrees with respect to the transmission board 140, the reception board 150 may wirelessly receive the image signals of the four lanes transmitted from any one antenna pattern group of the transmission board 140. In addition, in this aspect, it is assumed that corresponding to the image signals of the four lanes, the reception board 150 has the four antenna patterns 152A, 152B, 152C, and 152D. However, in accordance with increase or decrease in a number of lanes of image signal, a number of the antenna patterns of the reception board 150 may increase or decrease.

Here, transmission and reception of image signals between the transmission board 140 and the reception board 150 is explained in detail with reference to FIG. 5 as an example.

The transmission board 140 has the four antenna pattern groups #1 to #4 connected in series. Meanwhile, the reception board 150 has the antenna patterns 152 facing one antenna pattern group among the four antenna pattern groups #1 to #4 of the transmission board 140. Here, for example, as shown in an upper drawing of FIG. 5, the antenna pattern 142*s* of the antenna pattern group #1 of the transmission board 140 and the antenna patterns 152 of the reception board 150 are assumed to face each other.

In this state, the image signals transmitted from the antenna patterns 142 of the antenna pattern group #1 are received by the antenna patterns 152. In addition, the same image signals are transmitted from the antenna patterns 142 of the antenna pattern groups #2 to #4, but since the insulating regions 153 face the antenna pattern groups #2 to #4, these image signals are not received, and there is no electrical influence on the circuit of the reception board 150.

Figure 5:
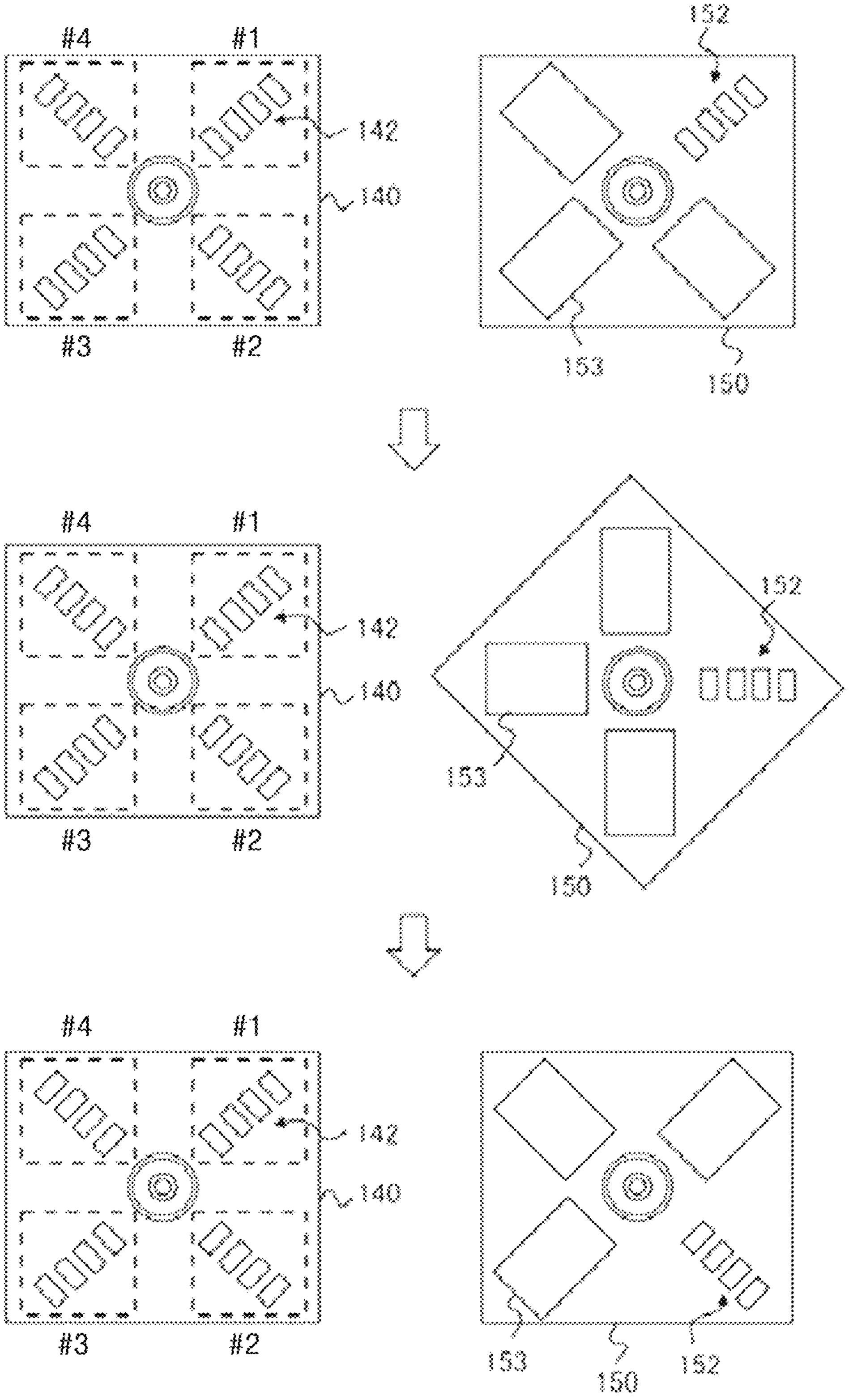
FIG. 5 is a view illustrating a rotation of a board of the present disclosure.

Furthermore, when the reception board 150 rotates with respect to the transmission board 140, as shown in a middle drawing of FIG. 5, and then the rotation angle becomes 90 degrees, the antenna patterns 142 of the antenna pattern group #2 of the transmission board 140 and the antenna patterns 152 of the reception board 150 face each other, as shown in a lower drawing of FIG. 5.

In this state, the image signals transmitted from the antenna patterns 142 of the antenna pattern group #2 are received by the antenna patterns 152. In addition, the same image signals are transmitted from the antenna patterns 142 of the antenna pattern group #1, #3, and #4, but since the insulating regions 153 face the antenna pattern groups #1, #3, and #4, these image signals are not received, and there is no electrical effect on the circuit of the reception board 150.

Hereinafter, in a similar way, whenever the reception board 150 rotates 90 degrees with respect to the transmission board 140, the antenna patterns 152 of the reception board 150 may face any one of the antenna pattern groups, and receive the image signals transmitted from the antenna patterns 142 of the antenna pattern group facing the antenna patterns 152. In addition, to transmit and receive such the image signals, there is no need to add a circuit that detects the rotation angle of the reception board 150 or a circuit that changes an image signal array. In other words, images may be displayed on the rotatable display screen while suppressing or reducing increases in circuit size and cost.

According to this aspect, the plurality of antenna pattern groups each including the plurality of antenna patterns are arranged at rotationally symmetric positions on the transmission board, and the corresponding antenna patterns of the antenna pattern groups are connected in series. The antenna patterns corresponding to one antenna pattern group are placed on the reception board that rotates with respect to the transmission board. Therefore, without installing additional circuit, the rotating reception board may receive the image signals transmitted from any one of the antenna pattern groups on the transmission board, and images may be displayed on the display panel that rotates integrally with the reception board. In other words, images may be displayed on the rotatable display screen while suppressing or reducing increases in circuit size and cost.

A characteristic of Aspect 2 is that a plurality of antenna pattern groups each including a plurality of antenna patterns are arranged at rotationally symmetric positions on a reception board, and antenna patterns corresponding to one antenna pattern group are arranged on the transmission board.

A configuration of a display system according to a second aspect is the same as the first aspect (shown in FIG. 1), so description thereof may be omitted or briefly provided. In addition, in the display system according to the second aspect, a connection structure of a transmission board 140 and a reception board 150 is the same as that of the first aspect (shown in FIG. 2), so description thereof may be omitted or briefly provided. In the second aspect, a configuration of the transmission board 140 and the reception board 150 is different from that of the first aspect.

Figure 6A:
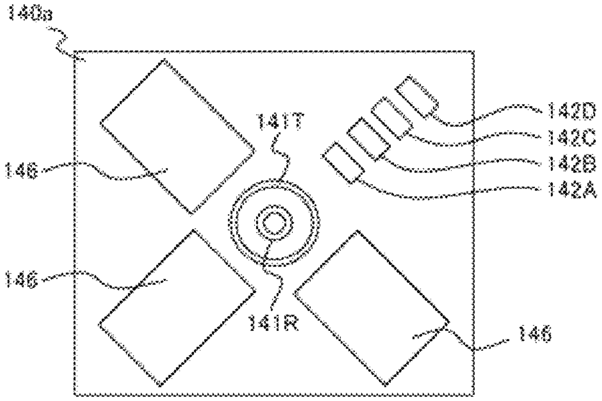
FIGS. 6A and 6B are views illustrating examples of a transmission board according to a second aspect of the present disclosure.
Figure 6B:
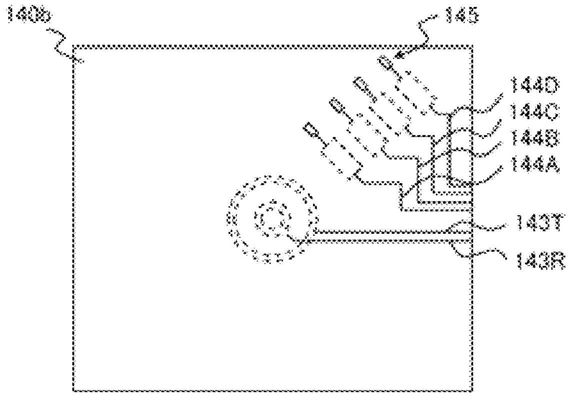

FIGS. 6A and 6B are views illustrating examples of a transmission board according to a second aspect. FIG. 6A is a plan view of a surface 140*a* facing the reception board 150, and FIG. 6B is a plan view of a rear surface 140*b* opposite to the surface 140*a*. In FIGS. 6A and 6B, the same parts as those in FIGS. 3A and 3B are given the same reference numbers.

As shown in FIG. 6A, antenna patterns 141T and 141R, antenna patterns 142A, 142B, 142C and 142D, and insulating regions 146 are formed on the surface 140*a*.

The antenna patterns 141T and 141R are metal patterns formed in concentric circles with a center of the surface 140*a* as a central point. The antenna patterns 141T and 141R wirelessly transmit and receive control signals to and from the reception board 150. Specifically, the antenna pattern 141T wirelessly transmits the control signal to the reception board 150, and the antenna pattern 141R wirelessly receives the control signal from the reception board 150. The antenna pattern 141R has a smaller diameter than the antenna pattern 141T, and a shaft member 210 is connected to inside the antenna pattern 141R.

The antenna patterns 142A, 142B, 142C, and 142D are metal patterns arranged radially with respect to the center of the surface 140*a*. For example, the antenna patterns 142A, 142B, 142C, and 142D are arranged, in this order, in a line outward from the center of the surface 140*a*. The antenna patterns 142A, 142B, 142C, and 142D wirelessly transmit image signals to the reception board 150. That is, each of the four antenna patterns 142A, 142B, 142C, and 142D wirelessly transmit the image signal of the corresponding lane among the image signals of the four lanes.

The antenna patterns 142A, 142B, 142C, and 142D arranged in a line are disposed at positions facing the antenna patterns 152A, 152B, 152C, and 152D formed on the surface 150*a* of the reception board 150. For example, the antenna patterns 142A, 142B, 142C, and 142D are disposed at positions corresponding to the antenna patterns 152A 152B, 152C, and 152D of one antenna pattern group on the reception board 150. In this way, the antenna patterns 142A, 142B, 142C, and 142D face one antenna pattern group of the reception board 150, so that one antenna pattern group facing them among the four antenna pattern groups of the reception board 150 may receive the image signals. In other words, it becomes possible to transmit and receive the image signals between the opposing antenna patterns each time the reception board 150 rotates by 90 degrees with respect to the transmission board 140.

The insulating region 146 is a region where a substrate of the transmission board 140, which is an insulator, is exposed at least in part. The substrate of the transmission board 140 may be exposed throughout the insulating region 146, and a metal ground pattern may be disposed in a mesh shape on a portion of the insulating region 146. Alternatively, the insulating region 146 may be a through hole formed by digging out the substrate of the transmission board 140.

The insulating region 146 is disposed at a position facing the antenna patterns 152A, 152B, 152C, and 152D formed on the surface 150*a* of the reception board 150. For example, three insulating regions 146 are formed at positions corresponding to the antenna patterns 152A, 152B, 152C, and 152D of the three antenna pattern groups on the reception board 150. By forming the insulating regions 146, the image signals are not transmitted to the antenna pattern groups of the reception board 150 that do not face the antenna patterns 142A, 142B, 142C, and 142D.

As shown in FIG. 6B, signal lines 143T and 143R, signal lines 144A, 144B, 144C, and 144D, and termination resistors 145 are formed on the surface 140*b*.

One ends of the signal lines 143T and 143R are connected to the input/output terminals 130, and the other ends are connected to the antenna patterns 141T and 141R. For example, the signal line 143T connects the input/output terminal 130 with the antenna pattern 141T, and the signal line 143R connects the input/output terminal 130 with the antenna pattern 141R. The ends of the signal lines 143T and 143R connected to the antenna patterns 141T and 141R penetrate the transmission board 140 from the surface 140*b* to the surface 140*a*, and are thus connected to the antenna patterns 141T and 141R formed on the surface 140*a*.

The signal lines 143T and 143R transmit the control signals between the input/output terminals 130 and the antenna patterns 141T and 141R. Specifically, the signal line 143T transmits the control signal input to the input/output terminal 130 to the antenna pattern 141T. The signal line 143R transmits the control signal received by the antenna pattern 141R to the input/output terminal 130.

One ends of the signal lines 144A, 144B, 144C, and 144D are connected to the input/output terminals 130, the signal lines 144A, 144B, 144C, and 144D passes through the antenna patterns 142A, 142B, 142C, and 142D, respectively, and the other ends of the signal lines 144A, 144B, 144C, and 144D are connected to the termination resistors 145. For example, the signal line 144A connects the input/output terminal 130, the antenna pattern 142A, and the termination resistor 145, the signal line 144B connects the input/output terminal 130, the antenna pattern 142B, and the termination resistor 145, the signal line 144C connects the input/output terminal 130, the antenna pattern 142C, and the termination resistor 145, and the signal line 144D connects the input/output terminal 130, the antenna pattern 142D, and the termination resistor 145. The connection portions of the signal lines 144A, 144B, 144C, and 144D connected to the antenna patterns 142A, 142B, 142C, and 142D penetrate the transmission board 140 from the surface 140*b* to the surface 140*a*, and are thus connected to the antenna patterns 142A, 142B, 142C, and 142D formed on the surface 140*a*.

In addition, the signal lines 144A, 144B, 144C, and 144D transmit the image signals input to the input/output terminals 130 to the respective antenna patterns 142A, 142B, 142C, and 142D. Specifically, the signal line 144A transmits the image signal input to the input/output terminal 130 to the antenna pattern 142A, the signal line 144B transmits the image signal input to the input/output terminal 130 to the antenna pattern 142B, the signal line 144C transmits the image signal input to the input/output terminal 130 to the antenna pattern 142C, and the signal line 144D transmits the image signal input to the input/output terminal 130 to the antenna pattern 142D.

The termination resistors 145 are connected to the ends of the signal lines 144A, 144B, 144C, and 144D, and reduce signal reflection of the image signals transmitted through the signal lines 144A, 144B, 144C, and 144D.

As such, on the surface 140*a* of the transmission board 140, the antenna patterns 142A, 142B, 142C, and 142D are located at the position corresponding to one antenna pattern group among the four antenna pattern groups of the reception board 150, and the insulating regions 146 are formed at the positions corresponding to the remaining three antenna pattern groups. Therefore, even when the reception board 150 rotates by 90 degrees with respect to the transmission board 140, the image signals of the four lanes may be wirelessly transmitted to any one antenna pattern group of the reception board 150. In addition, in this aspect, it is assumed that corresponding to the image signals of the four lanes, the transmission board 140 has the four antenna patterns 142A, 142B, 142C, and 142D. However, in accordance with increase or decrease in a number of lanes of image signal, a number of the antenna patterns of the transmission board 140 may increase or decrease.

Figure 7A:
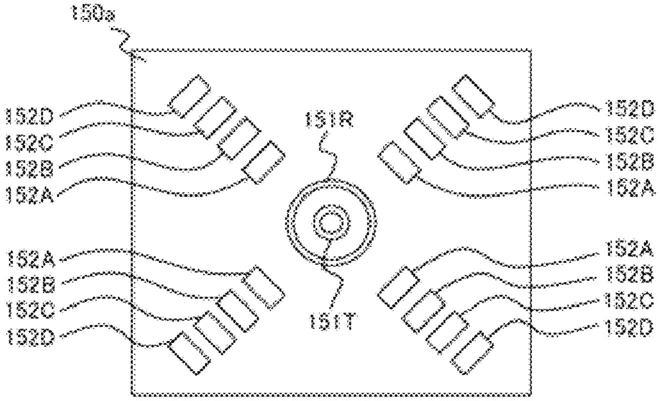
FIGS. 7A and 7B are views illustrating examples of a reception board according to the second aspect of the present disclosure.
Figure 7B:
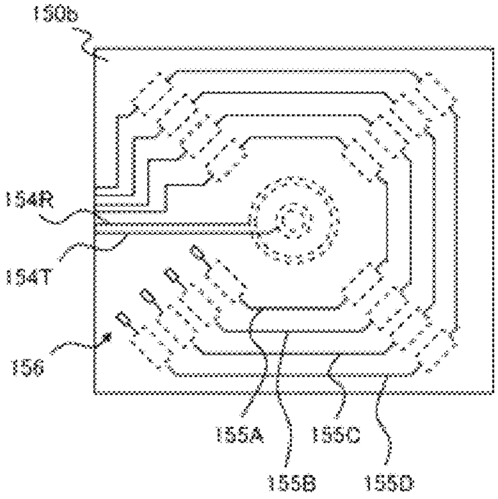

FIGS. 7A and 7B are views illustrating examples of a reception board according to a second aspect. FIG. 7A is a plan view of a surface 150*a* facing a transmission board 140, and FIG. 7B is a plan view of a rear surface 150*b* opposite to the surface 150*a*. In FIGS. 7A and 7B, the same parts as those in FIGS. 4A and 4B are given the same reference numbers.

As shown in FIG. 7A, the antenna patterns 151R and 151T and the antenna patterns 152A, 152B, 152C and 152D are formed on the surface 150*a*.

The antenna patterns 151R and 151T are metal patterns formed in concentric circles with a center of the surface

150*a* as a central point. The antenna patterns 151R and 151T wirelessly transmit and receive the control signals to and from the transmission board 140. Specifically, the antenna pattern 151R wirelessly receives the control signal from the transmission board 140, and the antenna pattern 151T wirelessly transmits the control signal to the transmission board 140. The antenna pattern 151T has a smaller diameter than the antenna pattern 151R, and the shaft member 210 is connected inside the antenna pattern 151T.

The antenna patterns 151R and 151T face the antenna patterns 141T and 141R formed on the surface 140*a* of the transmission board 140. For example, the antenna pattern 151R faces the antenna pattern 141T, and the antenna pattern 151T faces the antenna pattern 141R. As the concentric antenna patterns 151R and 151T face the concentric antenna patterns 141T and 141R, the control signals may be transmitted and received even when the reception board 150 rotates with respect to the transmission board 140.

The antenna patterns 152A, 152B, 152C, and 152D are metal patterns arranged radially with respect to the center of the surface 150*a*. For example, the antenna patterns 152A, 152B, 152C, and 152D are arranged, in this order, in a line outward from the center of the surface 150*a*. The antenna patterns 152A, 152B, 152C, and 152D wirelessly receive the image signals from the transmission board 140. For example, each of the four antenna patterns 152A, 152B, 152C, and 152D wirelessly receive the image signal of the corresponding lane among the image signals of the four lanes.

A plurality of antenna pattern groups each including the antenna patterns 152A, 152B, 152C, and 152D arranged in a line are arranged to surround the antenna patterns 151R and 151T, and each antenna pattern group extends radially around the antenna patterns 151R and 151T. In FIG. 7, four antenna pattern groups are arranged, and the radial directions in which respective antenna pattern group extend are different by 90 degrees. For example, each antenna pattern group is configured with the antenna patterns 152A, 152B, 152C, and 152D arranged in a line from the center of the surface 150*a* toward each of the four vertices of the surface 150*a*.

The antenna patterns 152A, 152B, 152C, and 152D each have, for example, a square shape with a side of about 5 mm, and are arranged closely, so that even when the plurality of antenna pattern groups are arranged on the reception board 150, an increase in mounting area is limited. For example, an increase in size of the reception board 150 due to arranging the plurality of antenna pattern groups may be ignored.

The corresponding antenna patterns 152A, 152B, 152C, and 152D of the antenna pattern groups are equidistant from the center of the surface 150*a*. For example, all four antenna patterns 152A are arranged at the same distance from the center of the surface 150*a*, and for example, all four antenna patterns 152B are arranged at the same distance from the center of the surface 150*a*. As described later, four antenna patterns equidistant from the center are connected in series by a corresponding signal line and wirelessly receive the image signal of the same lane.

As such, the antenna patterns 151R and 151T are arranged concentrically with the center of the surface 150*a* as the center point, and the antenna patterns 152A, 152B, 152C and 152D are arranged in rotationally symmetric positions, so that when the reception board 150 is rotated every 90 degrees around the shaft member 210, the antenna pattern arrangement does not change in appearance.

As shown in FIG. 7B, signal lines 154R and 154T, signal lines 155A, 155B, 155C and 155D, and termination resistors 156 are formed on the surface 150*b*.

One ends of the signal lines 154R and 154T are connected to the timing controller 160, and the other ends of the signal lines 154R and 154T are connected to the antenna patterns 151R and 151T. For example, the signal line 154R connects the timing controller 160 with the antenna pattern 151R, and the signal line 154T connects the timing controller 160 with the antenna pattern 151T. The ends of the signal lines 154R and 154T connected to the antenna patterns 151R and 151T penetrate the reception board 150 from the surface 150*b* to the surface 150*a*, and are thus connected to antenna patterns 151R and 151T formed on the surface 150*a*.

In addition, the signal lines 154R and 154T transmit the control signals between the timing controller 160 and the antenna patterns 151R and 151T. Specifically, the signal line 154R transmits the control signal received by the antenna pattern 151R to the timing controller 160. The signal line 154T transmits the control signal output from the timing controller 160 to the antenna pattern 151T.

One ends of the signal lines 155A, 155B, 155C, and 155D are connected to the timing controller 160, the signal lines 155A, 155B, 155C, and 155D connects in series the corresponding antenna patterns 152A, 152B, 152C, and 152D of the antenna pattern groups, and the other ends of the signal lines 155A, 155B, 155C, and 155D are connected to the termination resistors 156. For example, the signal line 155A connects the timing controller 160, the four antenna patterns 152A, and the termination resistor 156, the signal line 155B connects the timing controller 160, the four antenna patterns 152B, and the termination resistor 156, the signal line 155C connects the timing controller 160, the four antenna patterns 152C, and the termination resistor 156, and the signal line 155D connects the timing controller 160, the four antenna patterns 152D, and the termination resistor 156. Connection portions of the signal lines 155A, 155B, 155C, and 155D connected to the antenna patterns 152A, 152B, 152C, and 152D penetrate the reception board 150 from the surface 150*b* to the surface 150*a*, and are thus connected to the antenna patterns 152A, 152B, 152C, and 152D formed on the surface 150*a*.

The signal lines 155A, 155B, 155C, and 155D transmit the image signals received by the antenna patterns 152A, 152B, 152C, and 152D of one antenna pattern group to the timing controller 160. Specifically, the signal line 155A transmits the image signal received by one antenna pattern 152A to the timing controller 160, the signal line 155B transmits the image signal received by one antenna pattern 152B to the timing controller 160, the signal line 155C transmits the image signal received by one antenna pattern 152C to the timing controller 160, and the signal line 155D transmits the image signal received by one antenna pattern 152D to the timing controller 160.

The termination resistors 156 are connected to the ends of the signal lines 155A, 155B, 155C, and 155D, and reduce signal reflection of the image signals transmitted through the signal lines 155A, 155B, 155C, and 155D.

As such, the four antenna patterns equidistant from the center of the reception board 150 are connected in series by the corresponding signal line, so that equidistant receiving antennas may be formed at the positions of the four antenna pattern groups. Therefore, even when the reception board 150 rotates by 90 degrees with respect to the transmission board 140, any one antenna pattern group may receive the image signals of the four lanes transmitted from the antenna patterns 142A, 142B, 142C, and 142D of the transmission board 140. In addition, in this aspect, it is assumed that corresponding to the image signals of the four lanes, each antenna pattern group has the four antenna patterns 152A, 152B, 152C, and 152D. However, in accordance with increase or decrease in a number of lanes of image signal, a number of the antenna patterns of each antenna pattern group may increase or decrease.

As described above, according to this aspect, the plurality of antenna pattern groups each having the plurality of antenna patterns are arranged at rotationally symmetric positions on the reception board, and the corresponding antenna patterns of the antenna pattern groups are connected in series. The antenna patterns corresponding to one antenna pattern group is placed on the transmission board. Therefore, without installing additional circuit, any one antenna pattern group of the rotating reception board may receive the image signals transmitted from the antenna patterns of the transmission board, and images may be displayed on the display panel that rotates integrally with the reception board. In other words, images may be displayed on the rotatable display screen while suppressing or reducing increases in circuit size and cost.

In addition, antenna pattern arrangements on the transmission board 140 and the reception board 150 are not limited to those shown in the above first and second aspects. For example, various modifications are possible in which a plurality of antenna pattern groups each including a plurality of antenna patterns are disposed in rotationally symmetric positions on one of the transmission board 140 and the reception board 150, and a plurality of antenna patterns corresponding to one antenna pattern group are formed on the other of the transmission board 140 and the reception board 150.

Figure 8A:
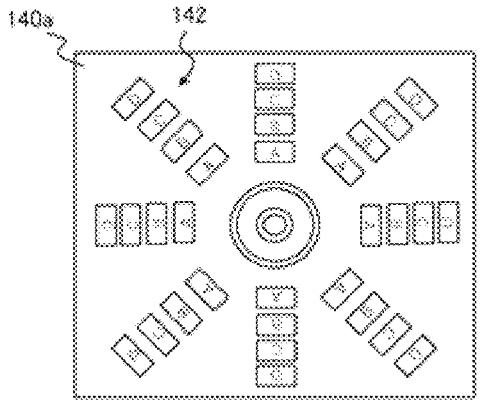
FIGS. 8A and 8B are views illustrating modified examples of antenna pattern arrangement of the present disclosure.
Figure 8B:
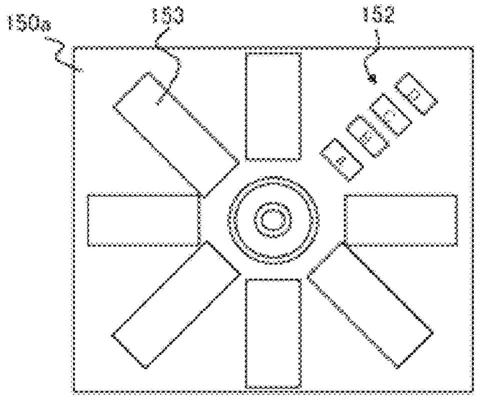

FIGS. 8A and 8B are views illustrating modified examples of antenna pattern arrangement. FIG. 8A is a plan view of a surface 140*a* of a transmission board 140, and FIG. 8B is a plan view of a surface 150*a* of a reception board 150. The surface 140*a* shown in FIG. 8A and the surface 150*a* shown in FIG. 8B face each other.

As shown in FIG. 8A, antenna patterns 142 are formed on the surface 140*a* of the transmission board 140, and the antenna patterns 142 are arranged radially in eight directions with respect to a center of the surface 140*a*. For example, eight antenna pattern groups, each being configured with four antenna patterns, are arranged in rotationally symmetric positions shifted by 45 degrees.

In this arrangement of the antenna patterns 142, among the antenna pattern groups, eight antenna patterns indicated as A in the drawing are connected in series, eight antenna patterns indicated as B in the drawing are connected in series, eight antenna patterns indicated as C in the drawing are connected in series, and eight antenna patterns indicated as D in the drawing are connected in series.

Meanwhile, as shown in FIG. 8B, antenna patterns 152 are formed on the surface 150*a* of the reception board 150 at a position corresponding to one antenna pattern group of the transmission board 140. In addition, insulating regions 153 are formed at positions corresponding to the remaining seven antenna pattern groups.

By using such the antenna pattern arrangement, it becomes possible to transmit and receive the image signals between the opposing antenna patterns each time the reception board 150 rotates by 45 degrees with respect to the transmission board 140. In FIG. 8, it is shown that the plurality of antenna pattern groups are arranged on the transmission board 140 and the antenna patterns corresponding to one antenna pattern group are arranged on the reception board 150. However, it is possible that a plurality of antenna pattern groups are arranged on the reception board 150, and antenna patterns corresponding to one antenna pattern group are arranged on the transmission board 140.

Figure 9A:
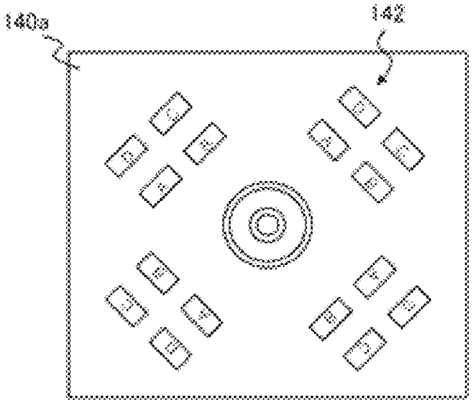
FIGS. 9A and 9B are views illustrating another modified examples of antenna pattern arrangement of the present disclosure.
Figure 9B:
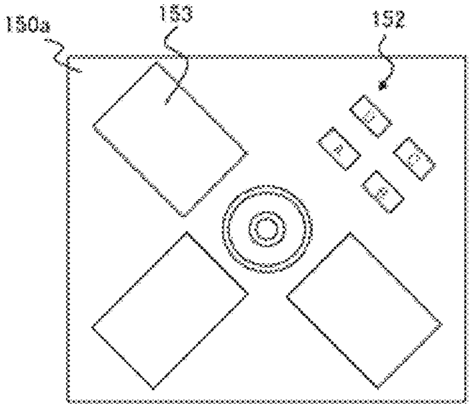

FIGS. 9A and 9B are views illustrating another modified examples of antenna pattern arrangement. FIG. 9A is a plan view of a surface 140*a* of a transmission board 140, and FIG. 9B is a plan view of a surface 150*a* of a reception board 150. The surface 140*a* shown in FIG. 9A and the surface 150*a* shown in FIG. 9B face each other.

As shown in FIG. 9A, antenna patterns 142 are formed on the surface 140*a* of the transmission board 140, and the antenna patterns 142 are arranged radially in two lines with respect to a center of the surface 140*a*. For example, four antenna pattern groups, each being configured with two rows and two columns of antenna patterns, are arranged in rotationally symmetric positions shifted by 90 degrees.

In this arrangement of the antenna patterns 142, among the antenna pattern groups, four antenna patterns indicated as A in the drawing are connected in series, four antenna patterns indicated as B in the drawing are connected in series, four antenna patterns indicated as C are connected in series, and four antenna patterns indicated as D are connected in series.

Meanwhile, as shown in FIG. 9B, antenna patterns 152 are formed on the surface 150*a* of the reception board 150 at a position corresponding to one antenna pattern group of the transmission board 140. In addition, insulating regions 153 are formed at positions corresponding to the remaining three antenna pattern groups.

By using such the antenna pattern arrangement, it becomes possible to transmit and receive the image signals between the opposing antenna patterns each time the reception board 150 rotates by 90 degrees with respect to the transmission board 140. In FIGS. 9A and 9B, it is shown that the plurality of antenna pattern groups are arranged on the transmission board 140, and the antenna patterns corresponding to one antenna pattern group are arranged on the reception board 150. However, it is possible that a plurality of antenna pattern groups are arranged on the reception board 150, and antenna patterns corresponding to one antenna pattern group are arranged on the transmission board 140.

Figure 10A:
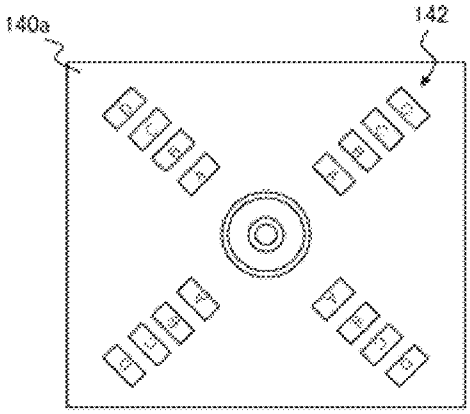
FIGS. 10A and 10B are views illustrating yet another modified examples of antenna pattern arrangement of the present disclosure.
Figure 10B:
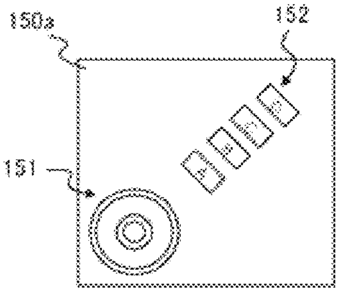

FIGS. 10A and 10B are views illustrating yet another modified examples of antenna pattern arrangement. FIG. 10A is a plan view of a surface 140*a* of a transmission board 140, and FIG. 10B is a plan view of a surface 150*a* of a reception board 150. The surface 140*a* shown in FIG. 10A and the surface 150*a* shown in FIG. 10B face each other.

As shown in FIG. 10A, antenna patterns 142 are formed on the surface 140*a* of the transmission board 140, and the antenna patterns 142 are arranged radially in a line with respect to a center of the surface 140*a*. For example, four antenna pattern groups, each being configured with four antenna patterns, are arranged in rotationally symmetric positions shifted by 90 degrees.

Meanwhile, as shown in FIG. 10B, the reception board 150 is smaller in size than the transmission board 140, and antenna patterns 152 are formed on the surface 150*a* of the reception board 150 at a position corresponding to one antenna pattern group of the transmission board 140. For example, the reception board 150 is sized so that the control signal antenna patterns 151 and the antenna patterns 152 corresponding to one antenna pattern group of the transmission board 140 are arranged. Therefore, the reception board 150 does not face the remaining three antenna pattern groups of the transmission board 140, and image signals transmitted from these antenna pattern groups are not received.

In this way, by configuring the transmission board 140 and the reception board 150 to have different sizes, it is possible to transmit and receive the image signals between the opposing antenna patterns each time the reception board 150 rotates by 90 degrees with respect to the transmission board 140. In FIG. 10, it is shown that the plurality of antenna pattern groups are arranged on the transmission board 140 and the reception board 150 is made smaller than the transmission board 140. However, it is possible that a plurality of antenna pattern groups are arranged on the reception board 150, and the transmission board 140 is made smaller than the reception board 150.

It will be apparent to those skilled in the art that various modifications and variation may be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A display device, comprising:

an input portion which receives a signal input and includes a transmission board transmitting the signal input; and a display portion which is rotatably connected to the input portion and includes a reception board receiving the signal transmitted from the transmission board, and a display panel displaying the signal received by the reception board, wherein one of the transmission board and the reception board includes:

a plurality of antenna pattern groups formed on a first surface of the one of the transmission board and the reception board, each antenna pattern group including a plurality of first antenna patterns that transmit or receive respective signals, the plurality of antenna pattern groups arranged at rotationally symmetric positions;

a signal line which is formed on a second surface that is opposite to the first surface, which connects in series corresponding first antenna patterns in different antenna pattern groups among the plurality of antenna pattern groups, wherein the corresponding first antenna patterns that are connected in series are arranged to be rotationally symmetric, and wherein another of the transmission board and the reception board includes a plurality of second antenna patterns that are arranged at a position facing one antenna pattern group among the plurality of antenna pattern groups, and that receive or transmit respective signals.

2. The display device of claim 1, wherein the first antenna patterns, corresponding to each other, of the plurality of antenna pattern groups are equidistant from a center of the one of the transmission board and the reception board.

3. The display device of claim 1, wherein the one of the transmission board and the reception board has a size equal to that of the another of the transmission board and the reception board.

4. The display device of claim 1, wherein the signal line penetrates the one of the transmission board and the reception board from the second surface to the first surface to be connected to the plurality of first antenna patterns.

5. The display device of claim 1, wherein each of the plurality of antenna pattern groups includes the plurality of first antenna patterns arranged radially with respect to a center of the first surface.

6. The display device of claim 5, wherein the plurality of second antenna patterns are arranged radially with respect to a center of the another of the transmission board and the reception board.

7. The display device of claim 1, wherein the another of the transmission board and the reception board includes an insulating region arranged at a position facing one or more antenna pattern groups other than the one antenna pattern group among the plurality of antenna pattern groups.

8. The display device of claim 7, wherein the insulating region is a region where a substrate of the another of the transmission board and the reception board is exposed at least in part.

9. The display device of claim 7, wherein a metal ground pattern is disposed in a mesh shape on a portion of the insulating region.

10. The display device of claim 7, wherein the insulating region is a through hole formed by digging out a substrate of the another of the transmission board and the reception board.

11. The display device of claim 1, wherein the one of the transmission board and the reception board includes a termination resistor connected to an end of the signal line.

12. The display device of claim 1, further comprising:

a shaft member which allows the transmission board and the reception board to face each other and rotatably connects the transmission board and the reception board; and a position adjustment member which fixes the transmission board and the reception board at a position that rotates at a predetermined angle, and adjusts positions of the transmission board and the reception board.

13. The display device of claim 1, wherein the one of the transmission board and the reception board includes a third antenna pattern having a circular shape in a region surrounded by the plurality of antenna pattern groups, and wherein the another of the transmission board and the reception board includes a fourth antenna pattern having a circular shape at a position facing the third antenna pattern.

14. The display device of claim 1, wherein a number of the plurality of first antenna patterns is equal to a number of the plurality of second antenna patterns.

15. The display device of claim 1, wherein the signal line includes a plurality of line segments arranged to be rotationally symmetric.

* * * * *